(12) United States Patent
Belyew

(10) Patent No.: US 8,163,050 B2
(45) Date of Patent: Apr. 24, 2012

(54) COMB FOR INLET BARRIER FILTER SYSTEM

(75) Inventor: Robert R. Belyew, St. Charles, MO (US)

(73) Assignee: Aerospace Filtration Systems, Inc., Chesterfield, MO (US)

( * ) Notice: Subject to any disclaimer, the term of this patent is extended or adjusted under 35 U.S.C. 154(b) by 296 days.

(21) Appl. No.: 12/523,684

(22) PCT Filed: Jan. 15, 2008

(86) PCT No.: PCT/US2008/051063
§ 371 (c)(1),
(2), (4) Date: Jul. 17, 2009

(87) PCT Pub. No.: WO2008/130725
PCT Pub. Date: Oct. 30, 2008

(65) Prior Publication Data
US 2010/0107576 A1 May 6, 2010

Related U.S. Application Data

(60) Provisional application No. 60/885,950, filed on Jan. 22, 2007.

(51) Int. Cl.
*B01D 46/00* (2006.01)
(52) U.S. Cl. ............... 55/306; 55/497; 55/500; 55/509; 55/521; 244/53 B
(58) Field of Classification Search .................. 55/306, 55/498, 521, 529, 497, 509, 500; 244/53 B, 244/53 R, 121, 1 R, 55, 207, 209; 60/39.092, 60/39.091
See application file for complete search history.

(56) References Cited

U.S. PATENT DOCUMENTS

| 2,553,512 | A | * | 5/1951 | Cotton, Jr. ..................... 55/306 |
| 6,138,950 | A | * | 10/2000 | Wainfan et al. ............ 244/53 B |
| 6,595,742 | B2 | | 7/2003 | Scimone |
| 6,824,582 | B2 | | 11/2004 | Wilson |
| 7,192,462 | B2 | | 3/2007 | Stelzer et al. |
| 7,491,253 | B2 | | 2/2009 | Wilson |
| 2007/0025838 | A1 | | 2/2007 | Stelzer |
| 2007/0151214 | A1 | * | 7/2007 | Stelzer et al. ................... 55/306 |
| 2009/0007528 | A1 | * | 1/2009 | Wilson ............................ 55/306 |
| 2009/0261208 | A1 | * | 10/2009 | Belyew ...................... 244/53 B |

FOREIGN PATENT DOCUMENTS

| EP | 0948985 A1 | 10/1999 |
| WO | 2008076471 A2 | 7/2007 |
| WO | 2008013725 A3 | 1/2008 |

OTHER PUBLICATIONS

PCT International Search Report and Written Opinion of the International Searching Authority mailed on Aug. 6, 2009 regarding PCT/US2008/051063 Filed on Jan. 15, 2008; 8 pages.

* cited by examiner

*Primary Examiner* — Duane Smith
*Assistant Examiner* — Minh-Chau Pham
(74) *Attorney, Agent, or Firm* — Armstrong Teasdale LLP

(57) ABSTRACT

An inlet barrier filter system for mounting on an aircraft to filter air prior to intake into an engine of the aircraft includes a frame having at least two curved frame members defining an opening. A filter element has a curved inward face and is received in the opening of the frame. The filter element includes filter media having pleats. A comb is attached to the frame and includes spaced-apart teeth that support the pleats. The comb is curved to generally conform to the curved inward face of the filter.

16 Claims, 4 Drawing Sheets

COMB FOR INLET BARRIER FILTER SYSTEM

CROSS REFERENCE TO RELATED APPLICATIONS

This patent application is a U.S. National Phase patent application of International Application Serial Number PCT/US2008/051063 filed on Jan. 15, 2008, which claims priority from U.S. Provisional Patent Application 60/885,950, filed Jan. 22, 2007.

BACKGROUND

The field of the invention relates to inlet barrier filter systems for mounting on aircraft to filter air prior to intake into an engine of the aircraft, and more particularly to combs for such systems.

SUMMARY OF THE INVENTION

One aspect is an inlet barrier filter system for mounting on an aircraft to filter air prior to intake into an engine of the aircraft. The filter system comprises a curved frame including at least two curved frame members defining an opening. A filter element has a curved inward face and is received in the opening of the frame. The filter element includes filter media having pleats. A comb is attached to the frame and includes spaced-apart teeth that support the pleats. It is not necessary that there be contact between the teeth and the pleats. The comb is curved to generally conform to the curved inward face of the filter element.

In another aspect, the inlet barrier filter system is mounted on a helicopter. The frame of the system is attached to the helicopter and is disposed to filter air prior to intake into the engine. The comb includes at least two separate, curved segments.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION OF THE DRAWINGS

Figure 1:
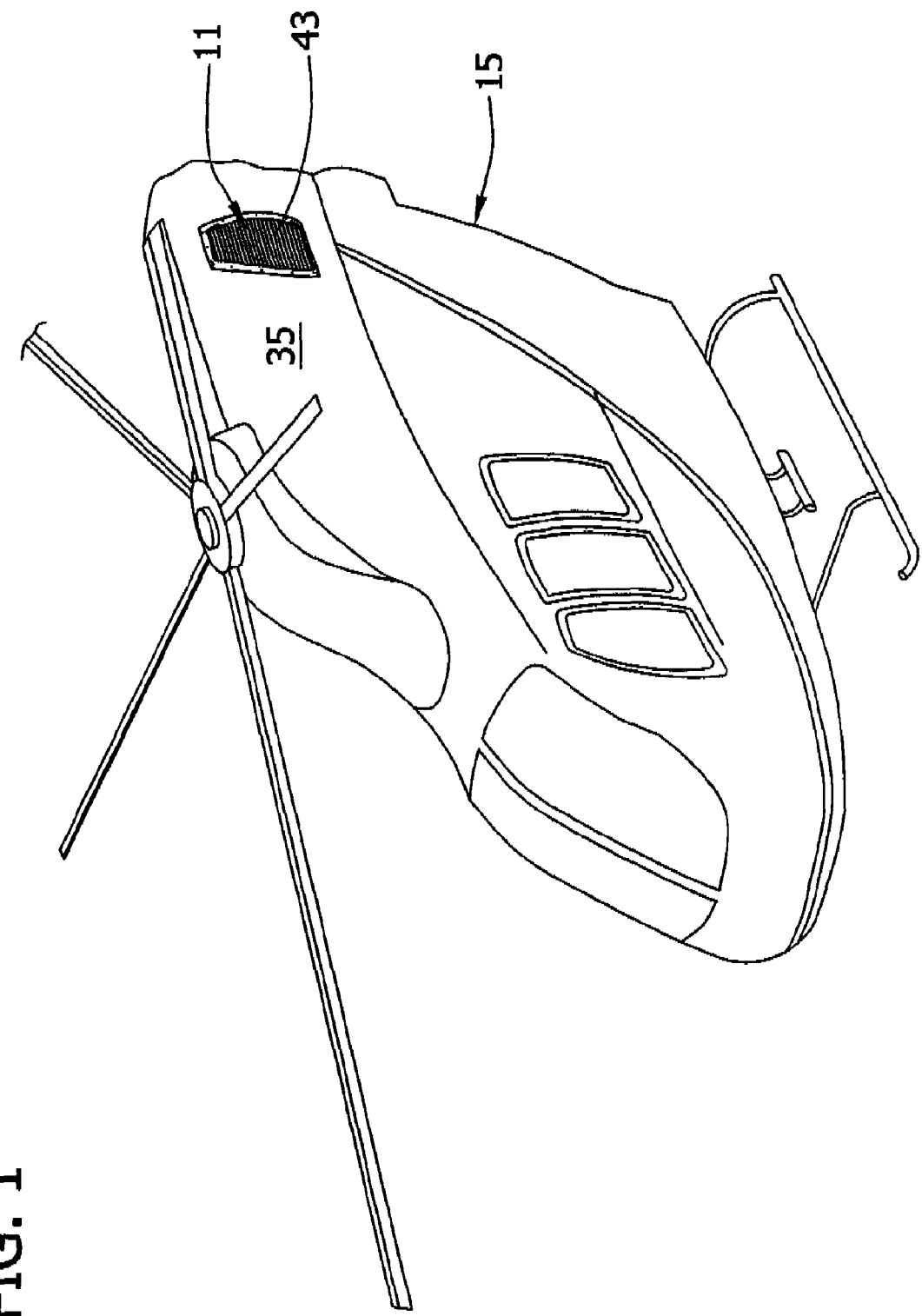
FIG. 1 is a perspective view of a portion of a helicopter including one embodiment of a filter system.
Figure 2:
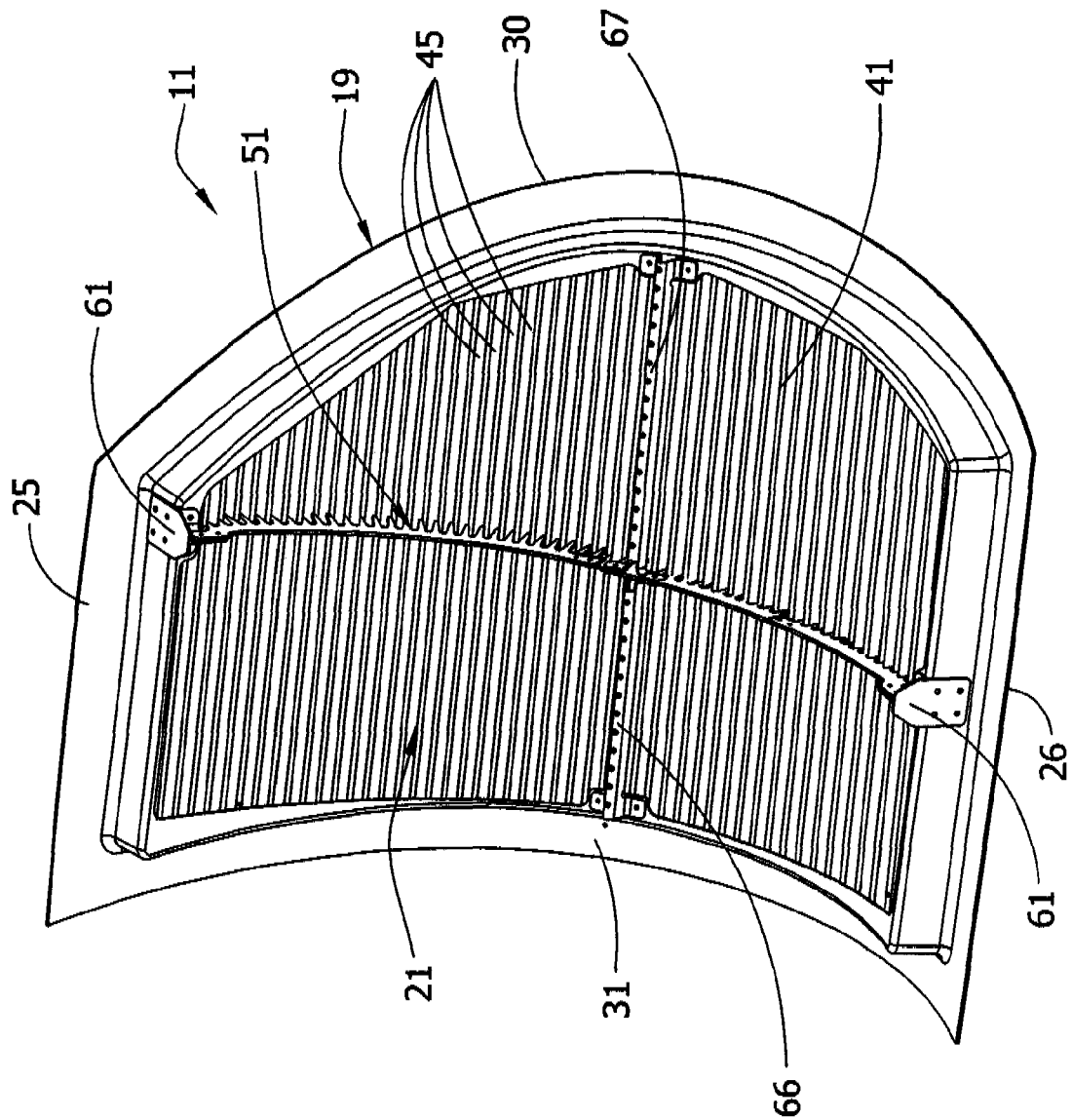
FIG. 2 is a perspective view of the filter system.

Referring to FIGS. 1-2, an inlet barrier filter system 11 of one embodiment is shown mounted or installed on a helicopter 15 (broadly, an aircraft). The system generally includes a frame 19 and a filter element 21, as further described below. The helicopter 15 may be similar to that shown in co-assigned U.S. Pat. Nos. 6,595,742; 6,824,582; U.S. application Ser. Nos. 11/192,900; 10/823,934; 11/192,964; 60/763,442 and 11/141,630, all of which are incorporated herein by reference. The system 11 is disposed so that the filter element 21 filters intake air prior to the air entering the engine.

Figure 4:
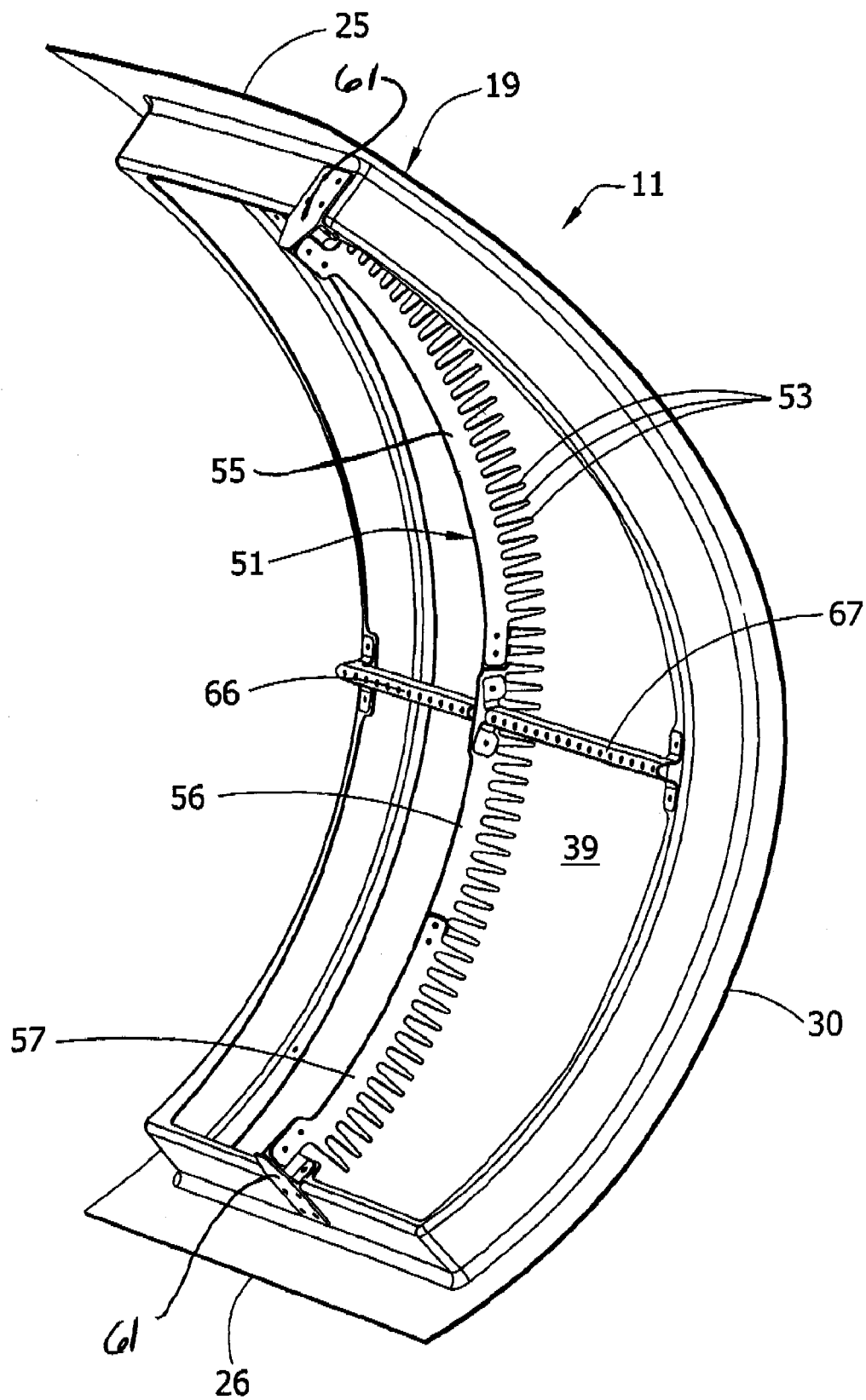
FIG. 4 is a perspective view of the filter system with the filter element omitted for clarity.

Referring to FIGS. 1-2 and 4, the frame 19 of this embodiment includes opposed top and bottom members, numbered 25 and 26 respectively, and opposed forward and rear side frame members, numbered 30 and 31 respectively. The top and bottom members 25, 26 are generally straight and are generally parallel to one another. As shown, the top member is significantly shorter than the bottom member in this embodiment. The side members 30, 31 are curved in a convex shape to conform to a convex portion of a moldline 35 of the helicopter 15. The forward side member 30 also curves outward laterally, while the rear side member 31 curves slightly inward laterally. The frame members 25, 26, 30, 31 may be formed integrally as one piece or formed separately and attached to form the frame 19 in any suitable manner. An opening 39 is defined by the frame members 25, 26, 30, 31 for receiving the filter element 21. Note that this is merely an example of a suitable frame, and other constructions are contemplated.

The filter element 21 is received in the opening of the frame 19 to filter intake air. The element 21 has curved inward and outward faces 41, 43, the inward face being concave and the outward face being convex. In this embodiment, the filter element 21 includes filter media having pleats 45, and the pleats generally extend from one side frame member to the other. Several examples of suitable filter media are described in the above-referenced patents and applications.

Figure 3:
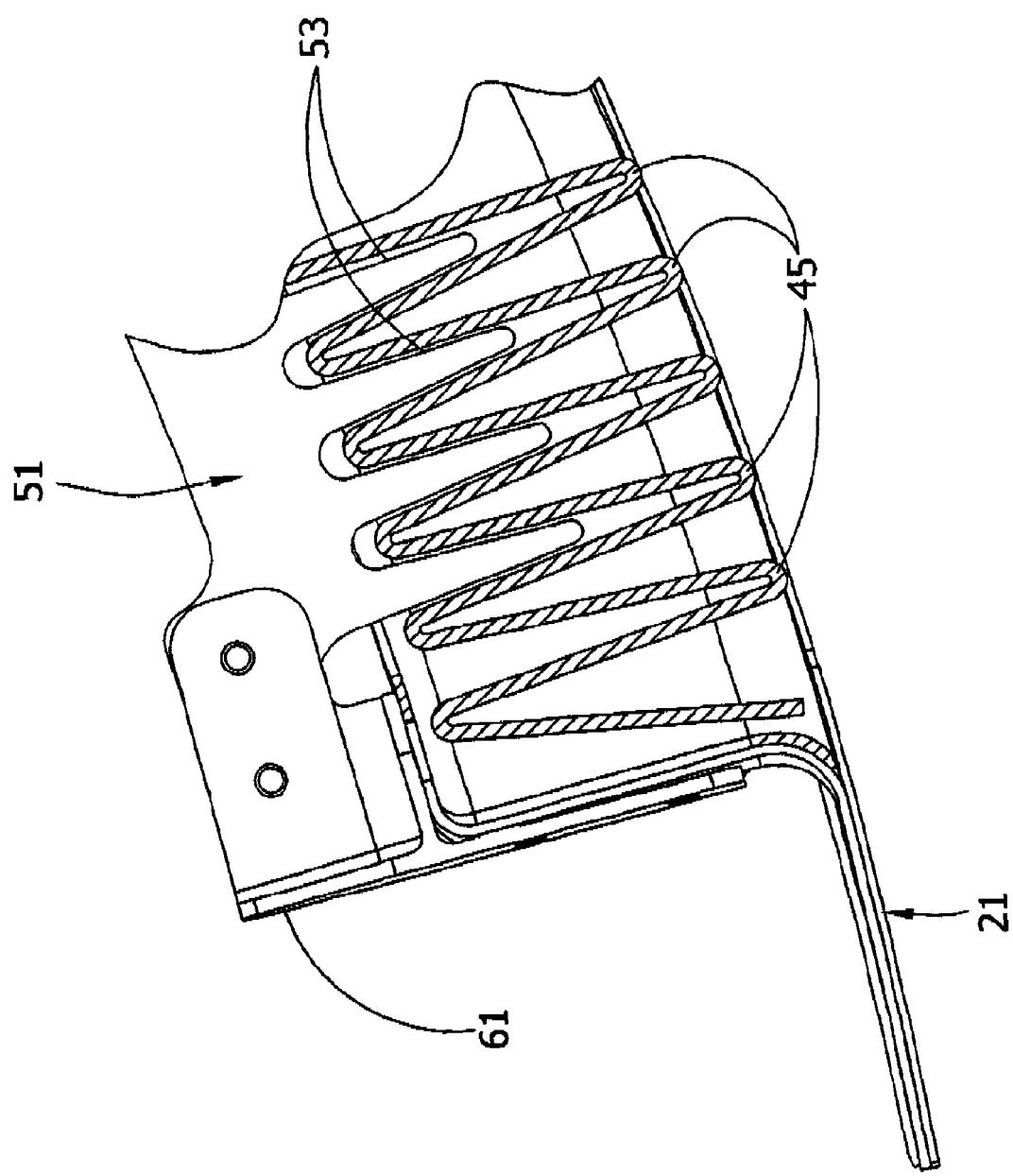
FIG. 3 is a section view showing a comb and pleats in a filter element of the filter system.

A comb 51 is attached to the frame 19 for supporting the filter media. The comb 51 includes spaced-apart teeth 53 that occupy the voids between the pleats 45 of the filter media. Note the teeth 53 of the comb 51 need not necessarily contact the media, as shown in FIG. 3. In use, the filter media will tend to deflect into contact with the comb 51. The comb 51 of this embodiment is curved to generally conform to the curved inward face 41 of the filter element 21. The comb 51 extends perpendicular from the bottom 26 to the top frame member 25, and is perpendicular to the pleats 45.

In this embodiment, the comb 51 includes at least three separate, curved segments. An upper segment 55 is attached at an end to the top frame members 25 and at an opposite end to a center segment 56. A lower segment 57 is attached at an end to the center segment and at an opposite end to the bottom frame member 26. The comb 51 can be attached to brackets 61 extending from the frame members 25, 26, and may be secured by fasteners, such as rivets, or by other suitable means.

Each segment 55, 56, 57 of the comb 51 includes no more than about 25 teeth to facilitate assembly of the filter system 11, e.g., in the potting process. More than about 25 teeth per segment makes the assembly much more difficult.

As best shown in FIG. 4, a strut stiffens the comb 51 and the overall filter system 11. The strut includes left and right strut members 66, 67, each extending from a respective side frame member 30, 31 to the comb 51. The strut members 66, 67 extend generally perpendicular to the respective frame members 30, 31 and to the comb 51. The strut members 66, 67 may be secured to the frame members 30, 31 and to the comb 51 by fasteners, such as rivets. The strut members 66, 67 include holes therein to reduce their weight and to facilitate airflow therethrough. The strut members 66, 67 are generally straight and channel-shaped in this embodiment, but may have other configurations within the scope of the invention.

In this embodiment, the filter system 11 is conformal, i.e., positioned along or adjacent the aircraft moldline 35. The system 11 thereby has minimal effect on the aerodynamic flowfield around the aircraft in flight (i.e., the slipstream), as discussed in more detail in the U.S. Pat. No. 6,595,742. As shown, the filter element 21 is disposed adjacent the moldline 35, and the curved outer face 43 of the filter element conforms to the moldline.

The frame 19, strut (e.g., strut members 66, 67) and comb 51 can be made of a variety of materials, and in one embodiment are made of aluminum, such as 6061-T6 or 6061-T651. Suitable filter media includes cotton, paper and other media described in the patents and applications incorporated above.

The comb 51 serves to support the filter element 21, for example, so that it does not collapse under air pressure exerted on the face of the filter element. The comb 51 and the struts also combine to stiffen the filter system 11.

When introducing elements of various aspects of the present invention or embodiments thereof, the articles "a", "an", "the" and "said" are intended to mean that there are one or more of the elements. The terms "comprising", "including" and "having" are intended to be inclusive and mean that there may be additional elements other than the listed elements. Moreover, the use of "top" and "bottom", "front" and "rear", "above" and "below" and variations of these and other terms of orientation is made for convenience, but does not require any particular orientation of the components.

Various refinements exist of the features noted in relation to the above-mentioned aspects. Further features may also be incorporated in the above-mentioned aspects as well. These refinements and additional features may exist individually or in any combination. For instance, various features discussed herein in relation to any of the illustrated embodiments may be incorporated into any of the above-described aspects, alone or in any combination.

As various changes could be made in the above constructions, methods and products without departing from the scope of the invention, it is intended that all matter contained in the above description or shown in the accompanying drawings shall be interpreted as illustrative and not in a limiting sense. Further, all dimensional information set forth herein is exemplary and is not intended to limit the scope of the invention.

What is claimed is:

1. An inlet barrier filter system for mounting on an aircraft to filter air prior to intake into an engine of the aircraft, the filter system comprising:
    a frame including at least two curved frame members defining an opening;
    a filter element having a curved inward face and received in the opening of the frame;
    the filter element including filter media having pleats;
    a comb attached to the frame and including spaced-apart teeth, the comb supporting the pleats of the filter media; and
    the comb being curved to generally conform to the curved inward face of the filter element;
    a strut for stiffening the comb and the filter system.

2. The filter system of claim 1 wherein the comb includes at least two, separate, curved segments, the two segments being joined together and extending from one of the frame members to another of the frame members.

3. The filter system of claim 1 wherein each segment includes less than about 25 teeth.

4. The filter system of claim 1 wherein the comb includes at least three separate, curved segments, a first of the segments being attached at an end to one of the frame members and at an opposite end to a second segment, and a third segment being attached at an end to the second segment and at an opposite end to the frame.

5. The filter system of claim 4 wherein the frame includes opposing top and bottom members and opposing left and right side members, wherein the side members are curved to conform to the aircraft.

6. The filter system of claim 1 wherein a first strut member extends from the right frame member to the comb, and a second strut member extends from the left frame member to the comb, the struts extending generally perpendicular to the respective frame members and the comb.

7. The filter system of claim 1 wherein the frame is adjacent an outer moldline of the aircraft, a convex outer face of the filter element conforming to the outer moldline.

8. The filter system of claim 7 in combination with the aircraft and wherein the aircraft is a helicopter.

9. An inlet barrier filter system mounted on a helicopter to filter air prior to intake into an engine of the helicopter, the filter system comprising:
    a curved frame including at least two curved frame members and defining an opening, the frame being attached to the helicopter and disposed to filter air prior to intake into the engine;
    a filter element having a curved face and received in the opening of the frame;
    the filter element including filter media having pleats;
    a comb attached to the frame and supporting the pleats of the filter media;
    the comb being curved to generally conform to the curved face of the filter element; and
    the comb including at least two separate, curved segments, the two segments being joined together and extending from one of the frame members to another of the frame members.

10. The filter system of claim 9 wherein each segment includes less than about 25 teeth.

11. The filter system of claim 10 wherein the comb includes at least three separate, curved segments, a first of the segments being attached at an end to one of the frame members and at an opposite end to a second segment, and a third segment being attached at an end to the second segment and at an opposite end to the frame.

12. The filter system of claim 10 wherein the frame includes opposing top and bottom members and opposing left and right side members, wherein the side members are curved to conform to the aircraft.

13. The filter system of claim 12 further comprising a strut for stiffening the comb and the filter system.

14. The filter system of claim 13 wherein a first strut member extends from the right frame member to the comb, and a second strut member extends from the left frame member to the comb, the struts extending generally perpendicular to the respective frame members and the comb.

15. The filter system of claim 14 wherein the frame is adjacent an outer moldline of the aircraft, a convex outer face of the filter element conforming to the outer moldline.

16. An inlet barrier filter system for mounting on an aircraft to filter air prior to intake into an engine of the aircraft, the filter system comprising:
    a frame including at least two curved frame members defining an opening;
    a filter element having a curved inward face and received in the opening of the frame;
    the filter element including filter media having pleats;
    a comb attached to the frame and including spaced-apart teeth, the comb supporting the pleats of the filter media;
    the comb having less than about 25 teeth and being curved to generally conform to the curved inward face of the filter element.

* * * * *